United States Patent
Zhang et al.

(10) Patent No.: US 12,225,340 B2
(45) Date of Patent: Feb. 11, 2025

(54) WIRELESS EARPHONE, MOBILE PHONE AND SONIC RANGING METHOD

(71) Applicant: LUXSHARE ELECTRONIC TECHNOLOGY (KUNSHAN) LTD., Kunshan (CN)

(72) Inventors: ZhiZhong Zhang, Kunshan (CN); QingSong Yu, Kunshan (CN); RuiBao Liu, Kunshan (CN)

(73) Assignee: LUXSHARE ELECTRONIC TECHNOLOGY (KUNSHAN) LTD., Kunshan (CN)

( * ) Notice: Subject to any disclaimer, the term of this patent is extended or adjusted under 35 U.S.C. 154(b) by 190 days.

(21) Appl. No.: 18/073,374

(22) Filed: Dec. 1, 2022

(65) Prior Publication Data
US 2023/0179904 A1  Jun. 8, 2023

(30) Foreign Application Priority Data
Dec. 2, 2021  (CN) .......................... 202111459996.9

(51) Int. Cl.
*H04R 1/10* (2006.01)
*G01S 11/14* (2006.01)
*G06F 3/16* (2006.01)
*H04S 7/00* (2006.01)

(52) U.S. Cl.
CPC ............ *H04R 1/1041* (2013.01); *G01S 11/14* (2013.01); *G06F 3/165* (2013.01); *H04S 7/304* (2013.01); *H04R 2420/07* (2013.01); *H04R 2460/01* (2013.01)

(58) Field of Classification Search
None
See application file for complete search history.

(56) References Cited

U.S. PATENT DOCUMENTS

2008/0304361 A1  12/2008  Peng et al.
2010/0159833 A1  6/2010  Lewis et al.
(Continued)

FOREIGN PATENT DOCUMENTS

| CN | 210075544 U | 2/2020 |
| CN | 109151195 B | 1/2021 |
| CN | 112180378 A | 1/2021 |

(Continued)

*Primary Examiner* — Kenny H Truong
(74) *Attorney, Agent, or Firm* — Birch, Stewart, Kolasch & Birch, LLP (57) ABSTRACT

A sonic ranging method for a mobile phone and a wireless earphone. Firstly, the mobile phone performs an acoustic response test on the wireless earphone. The mobile phone generates a first audio sequence at a first time slot. The wireless earphone recognizes the first audio sequence to generate a second audio sequence. When the mobile phone recognizes the second audio sequence, the mobile phone estimates a length of elapsed time according to the time difference between a current time slot and the first time slot. When the mobile phone obtains the length of elapsed time, a distance between the wireless earphone and the mobile phone may be determined according to a delay compensation parameter and the length of elapsed time. Various potential applications can be implemented based on the invention without the needs for additional hardware circuits in the mobile phone.

6 Claims, 7 Drawing Sheets

(56) References Cited

U.S. PATENT DOCUMENTS

2014/0235290 A1    8/2014   Cho et al.
2018/0152795 A1*   5/2018   Lee ..................... H04R 1/1041

FOREIGN PATENT DOCUMENTS

| CN | 113055817 A | 6/2021 |
|---|---|---|
| CN | 113055870 A | 6/2021 |
| CN | 113311414 A | 8/2021 |
| CN | 113325404 A | 8/2021 |
| CN | 113655437 A | 11/2021 |
| JP | 2013-187585 A | 9/2013 |
| TW | 201813414 A | 4/2018 |
| TW | 202125456 A | 7/2021 |

* cited by examiner

WIRELESS EARPHONE, MOBILE PHONE AND SONIC RANGING METHOD

CROSS REFERENCE TO RELATED APPLICATION

This application claims the priority benefit of Chinese Patent Application Serial Number 202111459996.9, filed on Dec. 2, 2021, the full disclosure of which is incorporated herein by reference.

BACKGROUND

Technical Field

The application relates to a wireless earphone, in particular, to a sonic ranging method for a wireless earphone and a mobile phone.

Related Art

At present, wireless earphones are made smaller and smaller, and consequently easy to get lost. Therefore, a locating mechanism of the earphone is required. At present, a commonly used method is to generate audible signals by the earphone speaker, so that the users may hear to find. However, the method does not indicate specific range and it is still difficult in finding.

Meanwhile, with the development of stereo technology, the head posture may be required to implement various applications, such as adjusting the sound intensity of left and right headphones according to the head posture, or generating stereo effects. In a presently known solution, the attitude of user head is detected through a 3-axis gyroscope. The solution, however, requires additional chips, excessive cost and power consumption, and additional space.

SUMMARY

To solve the above technical problems, the embodiment of the present application provides a wireless earphone, a mobile phone, and a wireless ranging method for the wireless earphone and the mobile phone.

In the embodiment of the invention, the wireless earphone comprises an acoustic receiver module, a microprocessor, and a speaker module. The acoustic receiver module is used to receive ambient sound. The microprocessor is connected to the acoustic receiver module to process the ambient sound and generate a digital output signal. The speaker module is connected to the microprocessor, controlled by the microprocessor, and plays sound according to the digital output signal.

The mobile phone embodiment of the present application comprises an acoustic receiver module, a processor, a speaker module, and a memory device. The acoustic receiver module may receive ambient sound. The processor is connected to the acoustic receiver module to process the ambient sound and generate a digital output signal. The speaker module is connected to the processor, controlled by the processor, and plays sound according to the digital output signal. The memory device stores a delay compensation parameter, and the delay compensation parameter comprises a length of signal processing time required by the mobile phone and the wireless earphone to process the first audio sequence and a second audio sequence. When the mobile phone performs an acoustic response test on the wireless earphone, the processor generates a first audio sequence in the first time slot and plays it through the speaker module. The acoustic receiver module receives ambient sound and converts the ambient sound into a digital input signal to the processor. When the processor recognizes that the digital input signal comprises a second audio sequence transmitted from the wireless earphone, the processor estimates a distance between the wireless earphone and the mobile phone according to a length of elapsed time started from the first time slot and the delay compensation parameter.

In a further embodiment, the application proposes a sonic ranging method for mobile phone and wireless earphone. Firstly, the mobile phone performs an acoustic response test on the wireless earphone, comprising: the mobile phone generates a first audio sequence and plays it at a first time slot, and the wireless earphone generates a second audio sequence and plays it after recognizing the first audio sequence. When the mobile phone recognizes the second audio sequence, the mobile phone estimates the length of elapsed time according to the time difference between a current time slot and the first time slot. When the mobile phone obtains the length of elapsed time, the mobile phone determines the distance between the wireless earphone and the mobile phone according to the delay compensation parameter and the length of elapsed time.

In a further embodiment, the wireless earphone and the mobile phone perform a calibration procedure to obtain the delay compensation parameter. The calibration procedure comprises the following steps. Firstly, the wireless earphone is positioned at a first distance from the mobile phone, and the mobile phone performs an acoustic response test on the wireless earphone to obtain a first round-trip response time. Next, the wireless earphone is positioned at a second distance from the mobile phone, and the mobile phone performs the acoustic response test on the wireless earphone to obtain a second round-trip response time. Finally, the delay compensation parameter is deducted according to the difference between the first distance and the second distance, and the difference between the first round-trip response time and the second round-trip response time.

In a more specific embodiment, after the mobile phone generates the first audio sequence, the first audio sequence is first converted to an analog signal to be amplified and played through the speaker module of the mobile phone.

In a more specific embodiment, when the mobile phone performs the acoustic response test on the wireless earphone, the mobile phone may first send a wireless signal to notify the wireless earphone to turn on an audio listening function. When the wireless earphone starts the audio listening function, ambient sound is received, filtered, noise canceled, echo canceled, and digitized to generate a digital signal. Thus, the wireless earphone identifies whether the first audio sequence is included in the digital signal. When the wireless earphone recognizes that the digital signal contains the first audio sequence, it generates the second audio sequence, controls the speaker module in the wireless earphone to amplify and play sounds comprising the second audio sequence.

In a further embodiment, the mobile phone may regularly perform the acoustic response test on the wireless earphone to track changes of the distance, so as to implement corresponding functions according to the characteristics of the distance changes. For example, the mobile phone may control the wireless earphone to adjust the sound field effects, volume control, jump forward, jump backward, start playing, or stop playing.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include," "contain," and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . ." does not exclude other same elements existing in the process, the method, the article, or the device which comprises the element.

In the following embodiment, the same reference numerals are used to refer to the same or similar elements throughout the invention.

Figure 1:
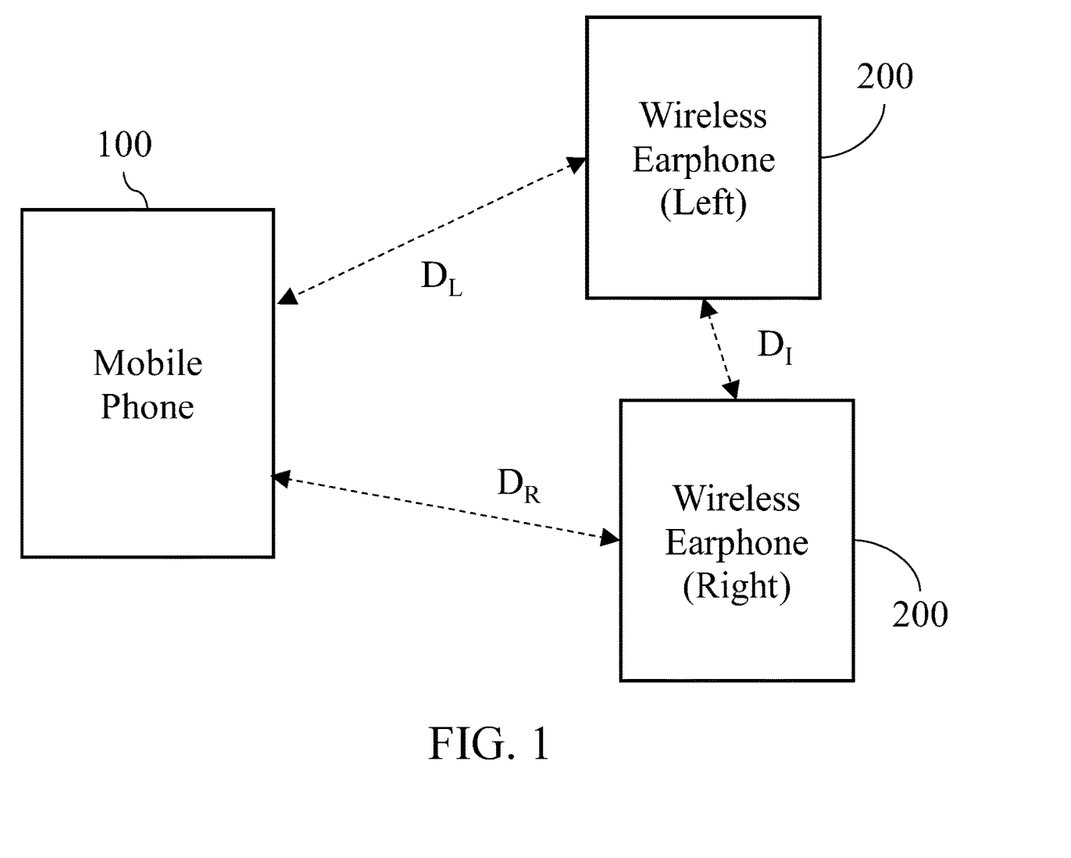
FIG. 1 is a schematic diagram of a mobile phone and a wireless earphone according to an embodiment of the application.

FIG. 1 is a connection diagram of a mobile phone and a wireless earphone according to an embodiment of the present application. True wireless stereo (TWS) earphones are common accessories nowadays. FIG. 1 shows a pair of wireless earphones 200 (left ear and right ear) paired with a mobile phone 100 as a local wireless system. The distance between each wireless earphone 200 and mobile phone 100 is expressed as $D_L$ and $D_R$, respectively. The separation between the two wireless earphones 200 may also be presented as a distance $D_T$.

Figure 2:
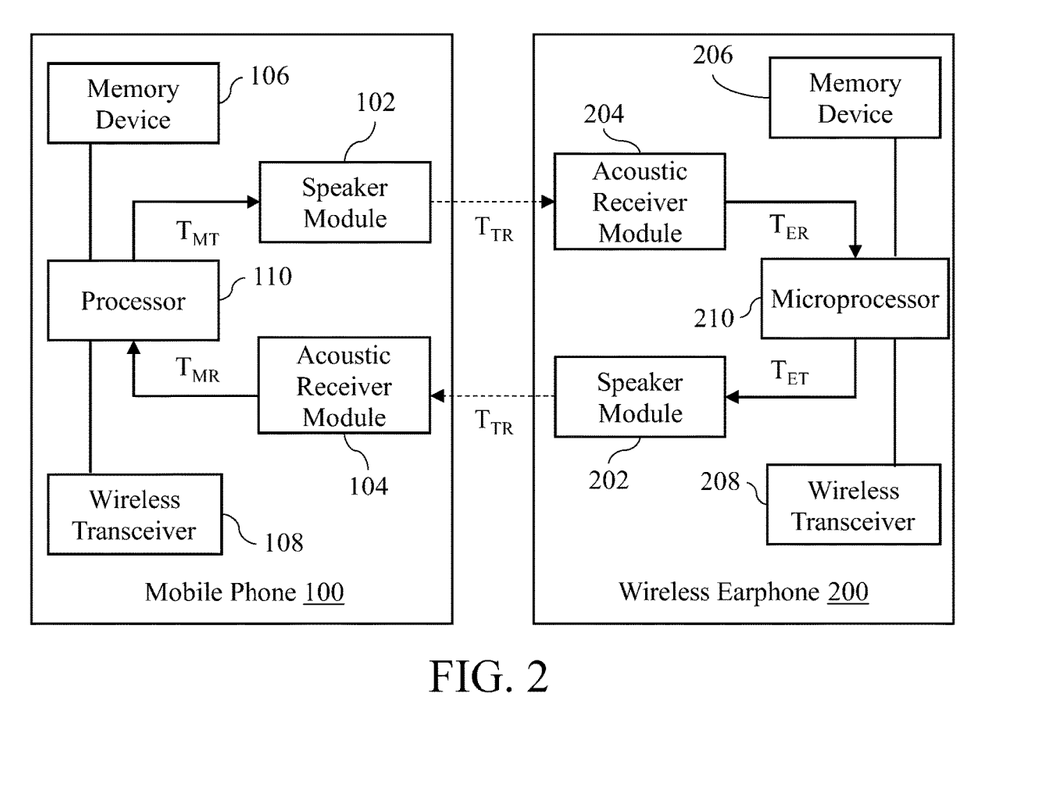
FIG. 2 is a schematic diagram of a mobile phone and a wireless earphone according to an embodiment of the application.

FIG. 2 is a schematic diagram of the architecture of mobile phone 100 and wireless earphone 200 according to the embodiment of the application. Since the wireless earphone 200 used by the left ear and the right ear exists independently, the embodiment only takes one of the wireless earphones 200 as an example. Therefore, it may be understood that the wireless earphone 200 shown in FIG. 2 is not limited to the left ear or the right ear.

In the embodiment of wireless earphone 200 in FIG. 2, the wireless earphone 200 comprises acoustic receiver module 204, microprocessor 210, speaker module 202, wireless transceiver 208, and memory device 206. The acoustic receiver module 204 may include a microphone array formed by one or more microphones for receiving ambient sound. The acoustic receiver module 204 also comprises a basic signal processing module, such as analog-to-digital converters (ADCs), filters, noise cancellation circuits, and etc. The microprocessor 210 is connected to the acoustic receiver module 204 to process the ambient sound and generate a digital output signal. The speaker module 202 is connected to the microprocessor 210 and is controlled by the microprocessor 210 to play sound according to the digital output signal. Since the embodiment focuses on the distance measurement method without using additional circuit elements, the detailed circuit design in the above acoustic receiver module 204, microprocessor 210, speaker module 202, memory device 206, and wireless transceiver 208 are taken as known implementations that will not be explained in detail herein.

The mobile phone 100 of FIG. 2 comprises at least an acoustic receiver module 104, a processor 110, a speaker module 102, a wireless transceiver 108, and a memory device 106. The acoustic receiver module 104 may receive ambient sound. The processor 110 is connected to the acoustic receiver module 104 to process the ambient sound and generate a digital output signal.

The speaker module 102 may be a speaker with a sound amplification function. In a more specific embodiment, the speaker module 102 may include a digital to analog converter (not shown) to convert the digital output signal generated by the mobile phone into an analog signal to be played through an amplifier. In other words, the speaker module 102 is connected to the processor 110 and is controlled by the processor 110 to play sound according to the digital output signal.

The memory device 106 stores a delay compensation parameter. The wireless transceiver 108 may support a variety of wireless protocols, such as Bluetooth, Wireless Fidelity (Wi-Fi), or near end communication (NFC). Similarly, since the present application focuses on the distance measurement method without using additional circuit elements, the detailed circuit design in the above acoustic receiver module 104, processor 110, speaker module 102, memory device 106, and wireless transceiver 108 are taken as known implementations that will not be introduced in detail herein.

One of the features of the application is that the provision of a delay compensation parameter. The delay compensation parameter is calculated by the mobile phone 100 through a calibration procedure with the wireless earphone 200, used to present the length of time required to process signals other than the time taken in sound wave transmissions. That is, the delay compensation parameter comprises the time spent by the mobile phone 100 and wireless earphone 200 in internal signal processing during wireless distance measurement.

When the mobile phone 100 performs an acoustic response test on the wireless earphone 200, the processor 110 generates a first audio sequence at the first time slot to be played through the speaker module 102. Next, the acoustic receiver module 104 receives ambient sound and generates a digital input signal to the processor 110. When the wireless earphone 200 responds a second audio sequence upon reception of the ambient sound comprising the first audio sequence. The processor 110 may estimate a round-trip time of the response by recognizing the second audio sequence transmitted from the wireless earphone 200. Specifically, the processor 110 estimates the length of elapsed time according to the time difference between the current time slot and the first time slot. Thereafter, the length of elapsed time is corrected according to the delay compensation parameter in memory device 106, and then the distance between the wireless earphone 200 and the mobile phone is estimated according to the formula of sound transmission in the air.

In a more specific embodiment, when the mobile phone performs the acoustic response test on the wireless earphone 200, it may first notify the wireless earphone 200 to turn on the audio listening function with the wireless signal. When the wireless earphone 200 turns on the audio listening function, it starts to receive ambient sound, filters the ambient sound, performs noise cancellation, echo cancellation, and digitalization on the ambient sound to generate a digital signal. Thus, the wireless earphone 200 identifies whether the first audio sequence is included in the digital signal. When the wireless earphone 200 recognizes that the digital signal contains the first audio sequence, a second audio sequence is generated. The wireless earphone 200 controls the speaker module in the wireless earphone 200 to amplify and play sound comprising the second audio sequence.

Considering the impact on human ears during the test, the transmitted sound wave frequency may be below 20 Hz, or above 20000 Hz, or a combination of multiple frequencies in the above range.

Figure 3:
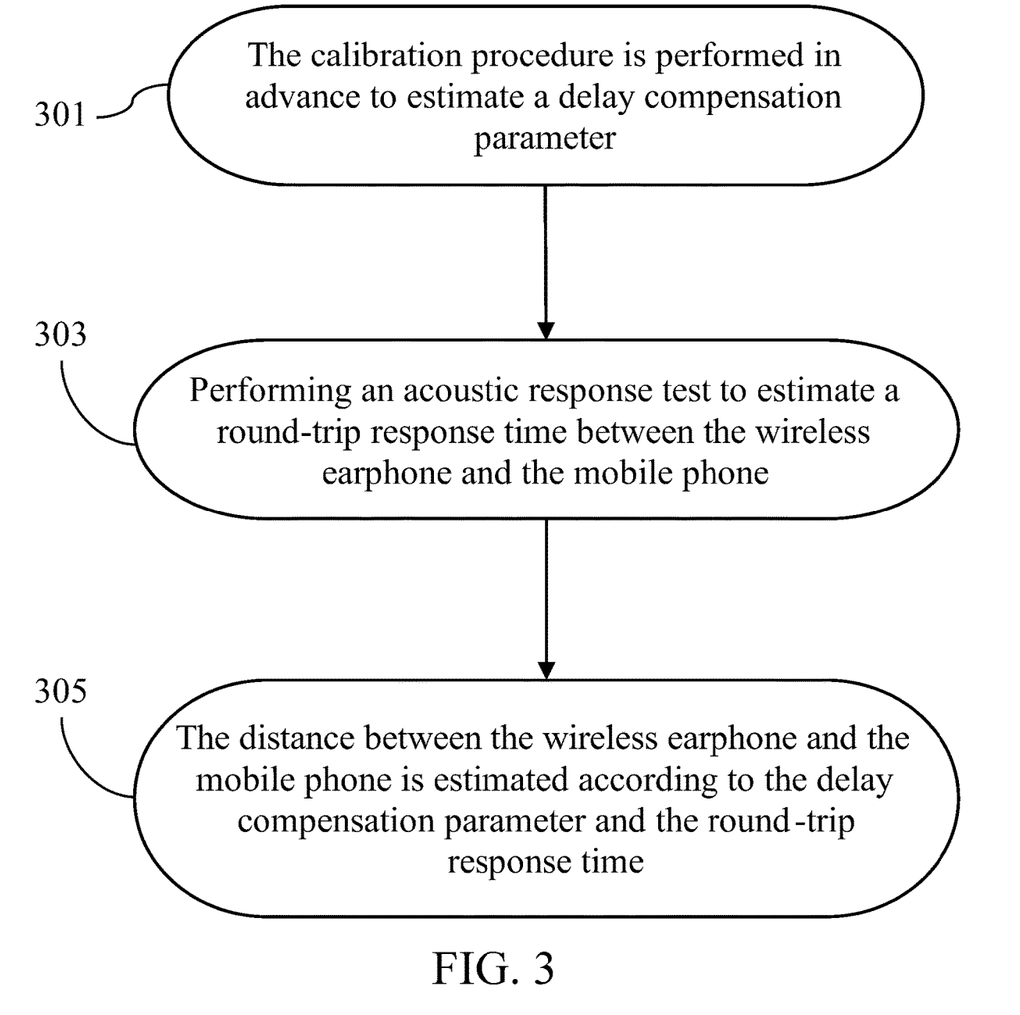
FIG. 3 is a flowchart of a wireless ranging method according to an embodiment of the application.

FIG. 3 is a flowchart of a wireless ranging method according to an embodiment of the application. The application proposes a sonic ranging method for mobile phone 100 and wireless earphone 200. First, in step 301, the calibration procedure is performed in advance to estimate a delay compensation parameter presenting the internal signal processing delay of mobile phone 100 and wireless earphone 200. Thereafter, in step 303, the wireless earphone 200 is subjected to an acoustic response test by the mobile phone 100 to estimate a round-trip response time between the wireless earphone 200 and the mobile phone 100. In step 305, when the mobile phone 100 obtains the round-trip response time, the distance between the wireless earphone 200 and the mobile phone 100 is estimated according to the delay compensation parameter and the round-trip response time. More specifically, the internal signal processing delay is subtracted from the round-trip response time to obtain the actual sound wave transmission time, so that the actual distance between the mobile phone and the earphone can be correctly deducted.

The following describes the algorithm of sound wave response time in combination with FIG. 2. It is assumed that the distance between the wireless earphone 200 and the mobile phone 100 is tr, and the air travel time of the sound wave is TTR. In mobile phone 100, the internal signal processing process may include a variety of steps, such as digital to analog conversion, filtering, denoise, echo cancellation, feature recognition, and etc. The internal signal processing delay should be counted. For example, the delay required for the processor 110 to generate the first audio sequence before playing through the speaker module 102 is TMT, while the delay required for the microprocessor 110 to recognize the second audio sequence out of the ambient sound received by the acoustic receiver module 104 is TMR. In the wireless earphone 200, a processing time Tet is taken by the microprocessor 210 to generate a second audio sequence, so that the speaker module 202 plays sound containing the second audio sequence. Meanwhile, a processing time Ter is required by the microprocessor 210 to recognize the first audio sequence out of the ambient sound received by the acoustic receiver module 204.

That is, the internal signal processing delay from wireless earphone 200 to mobile phone 100 is formulated:

$$T_{ETMR}=T_{ET}+T_{MR}$$

The internal signal processing delay from mobile phone 100 to wireless earphone 200 is formulated:

$$T_{MTER}=T_{MT}+T_{ER}$$

The delay compensation parameter is presented:

$$T_{OFFSET}=T_{MTER}+T_{ETMR}$$

The internal processing delay difference between the two is $$T_{\Delta TR}=T_{MTER}-T_{ETMR}$$

Hence, $$T_{MTER}=T_{\Delta TR}+T_{ETMR}$$

The total delay from the wireless earphone 200 to the mobile phone 100 is $T_{ME}$, formulated as:

$$T_{ME}=T_{TR}+T_{ET}+T_{MR}=T_{TR}+T_{ETMR}$$

The total delay from the mobile phone 100 to the wireless earphone 200 is $T_{EM}$, and the formula is:

$$T_{EM}=T_{TR}+T_{MT}+T_{ER}=T_{TR}+T_{MTER}=T_{TR}+T_{\Delta TR}+T_{ETMR}$$

Thus, the round-trip time between the mobile phone 100 and the wireless earphone 200 is presented as:

$$T_{MEM}=2*T_{TR}+T_{\Delta TR}+2*T_{ETMR}$$

When the mobile phone 100 starts the acoustic response test, a time stamp $T_0$ of the current time slot is recorded. The first audio sequence is generated and played through the speaker module 102. The first audio sequence may be encoded by pulse signals, and the sound carrying the first audio sequence may be transmitted at a specific frequency. When the wireless earphone 200 receives the sound through the acoustic receiver module 204, the microprocessor 210 decodes the sound to identify the first audio sequence. When the microprocessor 210 confirms the receipt of the first audio sequence, it generates a second audio sequence, and the speaker module 202 plays sound carrying the second audio sequence. The second audio sequence may also be encoded by pulse signals and carried by a soundwave of a specific frequency. The sound received by the acoustic receiver module 104 in the mobile phone 100 is decoded and recognized by processor 110. When the processor 110 confirms the receipt of the second audio sequence, the current time slot is recorded as a time stamp $T_1$. Thus, the round-trip time between the mobile phone 100 and the wireless earphone 200 is formulated:

$$T_{MEM} = T_1 - T_0$$

In other words, the total elapsed time from sending the first audio sequence to confirming the second audio sequence is:

$$2*T_{TR1} + T_{\Delta TR} + 2*T_{ETMR1} = T_{MEM}$$

Deducting the internal signal processing time of mobile phone 100 and wireless earphone 200, the actual sound transmission time between mobile phone 100 and wireless earphone 200 is formulated as:

$$T_A = T_{TR1} = (T_{MEM} - T_{\Delta TR} + 2*T_{EMTR1}))/2$$

Then, the known sonic transmission speed formula is considered as:

$$v = 331 + 0.6t$$

Wherein t is the Celsius temperature.

The sound speed v is obtained according to the sound speed formula, and the distance between the mobile phone 100 and the wireless earphone 200 may be estimated by multiplying the actual sound transmission time $T_A$.

$$L_A = v*T_A$$

According to the formula, the distance $L_A$ of wireless earphone 200 corresponding to mobile phone 100 can be estimated. Since the wireless earphone 200 of the left and right ears exists independently, the above ranging methods may be operated separately. In addition, since the ambient temperature contributes to the sonic formula, the mobile phone 100 of the embodiment of the application may also estimate the ambient temperature at that time through a sensor or online weather query functions, so as to improve the accuracy of distance measurement.

Figure 4:
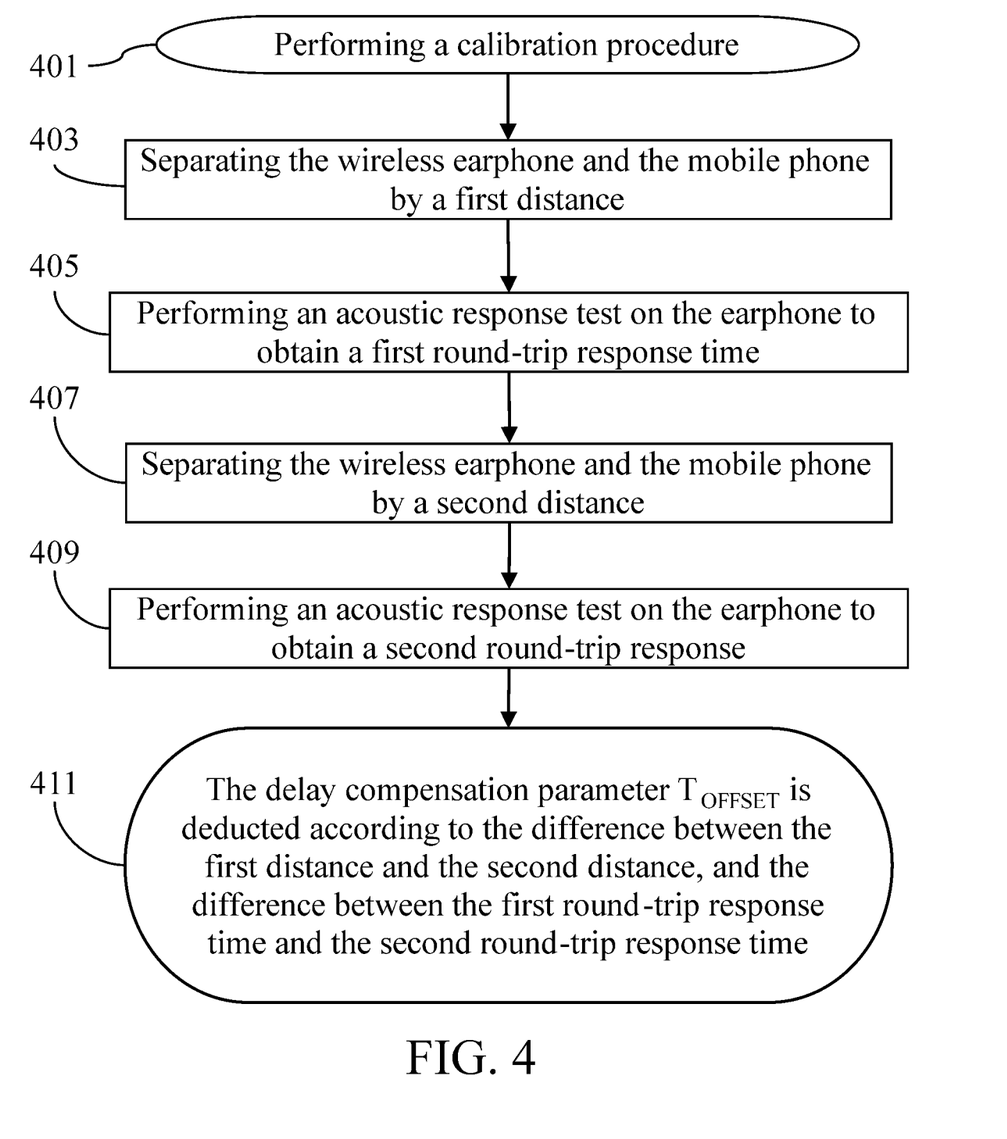
FIG. 4 is a flowchart of a calibration procedure according to an embodiment of the application.

FIG. 4 is a flowchart of a calibration procedure according to an embodiment of the application. In the aforementioned wireless ranging method, since the internal processing delay $T_{ETMR}$ from the wireless earphone 200 to the mobile phone 100 and the internal processing delay $T_{MTER}$ from the mobile phone 100 to the wireless earphone 200 are fixed values, a calibration procedure can be performed in advance to obtain the fixed values and store in the memory device 106. The specific steps are as follows:

First, in step 401, the calibration procedure is started. The calibration procedure may be carried out at the factory, or alternatively, the software application (APP) may be provided for users to calibrate by themselves. In step 403, the wireless earphone 200 and the mobile phone 100 are separated by a first distance. In step 405, the mobile phone 100 performs an acoustic response test on the wireless earphone 200 to obtain a first round-trip response time.

For example, the distance between mobile phone 100 and wireless earphone 200 is fixed to L1, and the acoustic response test is performed to obtain the first round-trip response time $T_{L1}$ $$T_{L1} = 2*T_{TRL1} + T_{\Delta TR} + 2*T_{ETMR}$$

Next, in step 407, the wireless earphone 200 and the mobile phone 100 are separated by a second distance. In step 409, the mobile phone 100 performs the acoustic response test on the wireless earphone 200 to obtain a second round-trip response time.

For example, the distance between mobile phone 100 and wireless earphone 200 is fixed to L2, and the acoustic response test is performed to obtain the second round-trip response time $T_{L2}$ $$T_{L2} = 2*T_{TRL2} + T_{\Delta TR} + 2*T_{ETMR}$$

Finally, in step 411, the delay compensation parameter $T_{OFFSET}$ is deducted according to the difference between the first distance and the second distance, and the difference between the first round-trip response time and the second round-trip response time.

Given that the distance L2=2*L1, the transfer time is assumed to be:

$$T_{TRL2} = 2*T_{TRL1}$$

Therefore, the delay compensation parameter $T_{OFFSET}$ may be calculated by the following formula:

$$2*T_{TRL1} = T_{L2} - T_{L1}$$

$$T_{TRL1} = (T_{L2} - T_{L1})/2$$

$$T_{OFFSET} = T_{\Delta TR} + 2*T_{ETMR} = T_{L1} - 2*T_{TRL1}$$

It can be concluded that the delay compensation parameter $T_{OFFSET}$ is the total time required for the mobile phone 100 and the wireless earphone 200 to process the first audio sequence and the second audio sequence.

Figure 5:
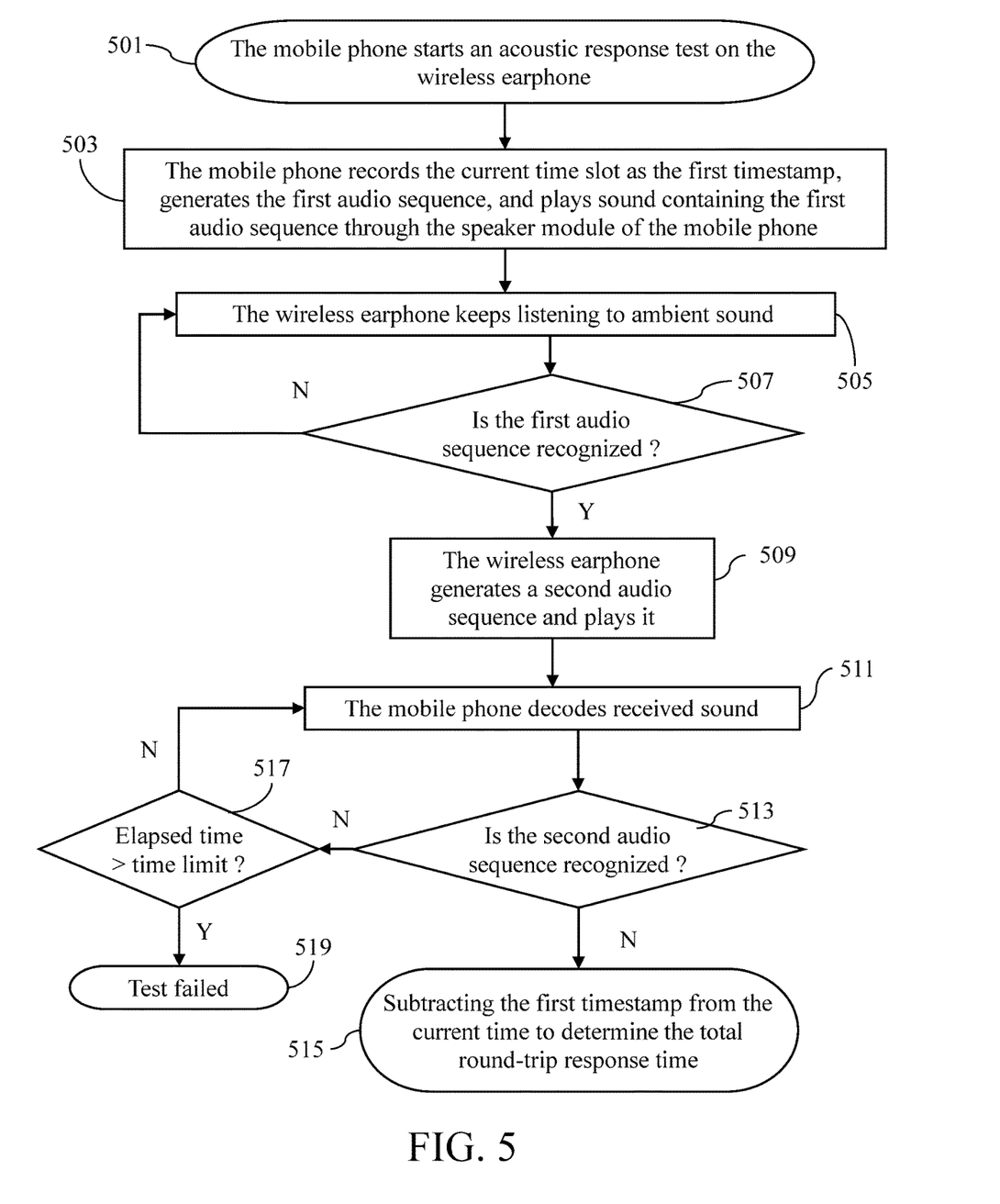
FIG. 5 is a flowchart of an acoustic response test according to an embodiment of the application.

FIG. 5 is a flowchart of an acoustic response test according to an embodiment of the application. Generally speaking, the aforementioned acoustic response test means that the mobile phone 100 generates and plays the first audio sequence at the first time slot, and the wireless earphone 200 generates and plays the second audio sequence after recognizing the first audio sequence. When the mobile phone 100 recognizes the second audio sequence, the mobile phone 100 estimates the length of elapsed time according to the time difference between the current time slot and the first time slot. The process is described in detail as follows:

In step 501, the mobile phone 100 starts an acoustic response test on the wireless earphone 200. In step 503, the mobile phone 100 records the current time slot as the first timestamp, generates the first audio sequence, and plays sound containing the first audio sequence through the speaker module 102 of the mobile phone. In step 505, the microprocessor 210 in the wireless earphone 200 decodes the received sound. In step 507, if the microprocessor 210 of the wireless earphone 200 recognizes the first audio sequence, proceed to step 509 to generate a second audio sequence, and plays sound containing the second audio sequence through the speaker module 202. If the first audio sequence is not recognized in step 507, continue to step 505. In step 511, after the mobile phone 100 sends the first audio sequence, the acoustic receiver module 104 also continuously listens to a response, wherein the processor 110 decodes received ambient sound. In step 513, if the mobile phone 100 recognizes the second audio sequence generated by the wireless earphone 200, proceed to step 515 to record the current time slot as the second timestamp. The second timestamp subtracting the first timestamp renders the total round-trip response time, and thus the acoustic response test is complete.

Usually, the wireless earphone 200 and the mobile phone 100 are connected by Bluetooth limited by an effective distance no more than 100 meters. Therefore, the theoretical sound transmission time will not exceed half a second. The acoustic response test of the embodiment may set a time limit. If no response is received beyond the time limit, the test is deemed failed. For example, if the second audio sequence of the response is not recognized in step 513, it is determined in step 517 whether the reception time exceeds a time limit. If the time limit has not been exceeded, repeat step 511. If the time is exceeded, it is determined that the acoustic response test is failed in step 519. Since soundwave transmission is taken as the main test method in the embodiments, low-frequency sound is preferable for testing as they can survive long distance deterioration and generates less disturbance to human ears.

Figure 6:
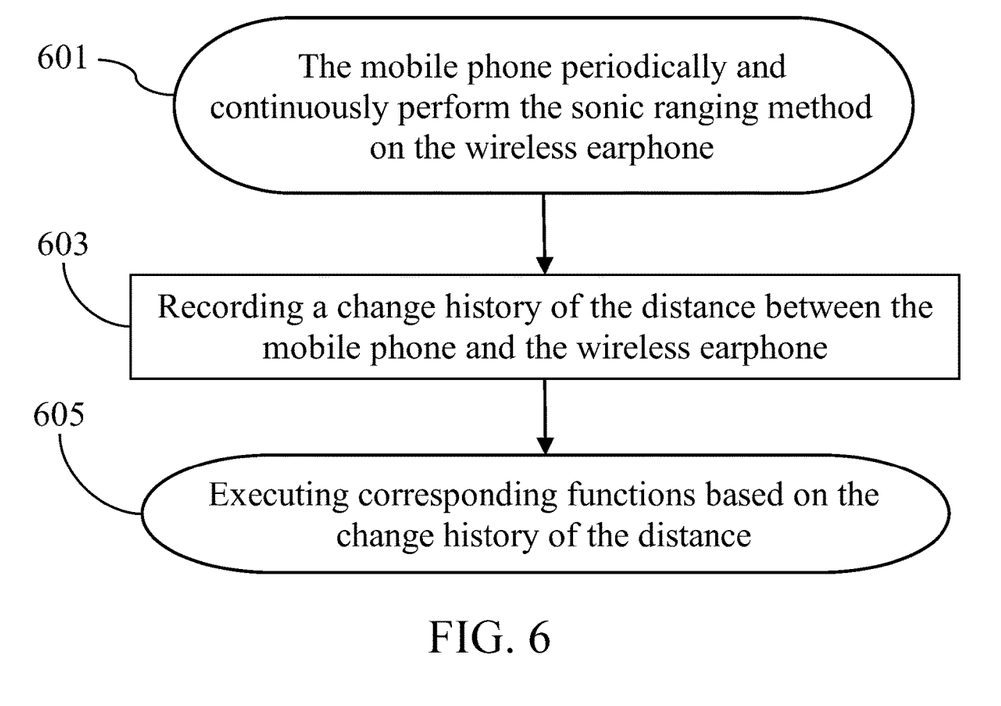
FIG. 6 is a flowchart of continuous ranging according to an embodiment of the application.

FIG. 6 is a flowchart of continuous ranging according to an embodiment of the application. In a further embodiment, the mobile phone 100 may periodically perform the acoustic response test on the wireless earphone 200 to track the changes of the distance, so that corresponding functions can be implemented according to the characteristics of the distance change.

In step 601, the mobile phone 100 may periodically and continuously perform the sonic ranging method shown in FIG. 3 on the wireless earphone 200. In step 603, the distance change history of wireless earphone 200 to mobile phone 100 is recorded. In step 605, the corresponding function can be triggered according to the historical changes of the distance between the wireless earphone 200 and the mobile phone 100. For example, the mobile phone 100 may control the wireless earphone 200 to adjust sound field effect, volume control, jump forward, jump backward, start playing, or stop playing. The embodiment of the present application may also be used to locate lost wireless earphone 200. For example, in the process of continuously tracking the distance, the mobile phone 100 can be moved around to obtain the distance change information between the mobile phone 100 and the wireless earphone 200, so that the relative position between the wireless earphone 200 may be determined.

Figure 7:
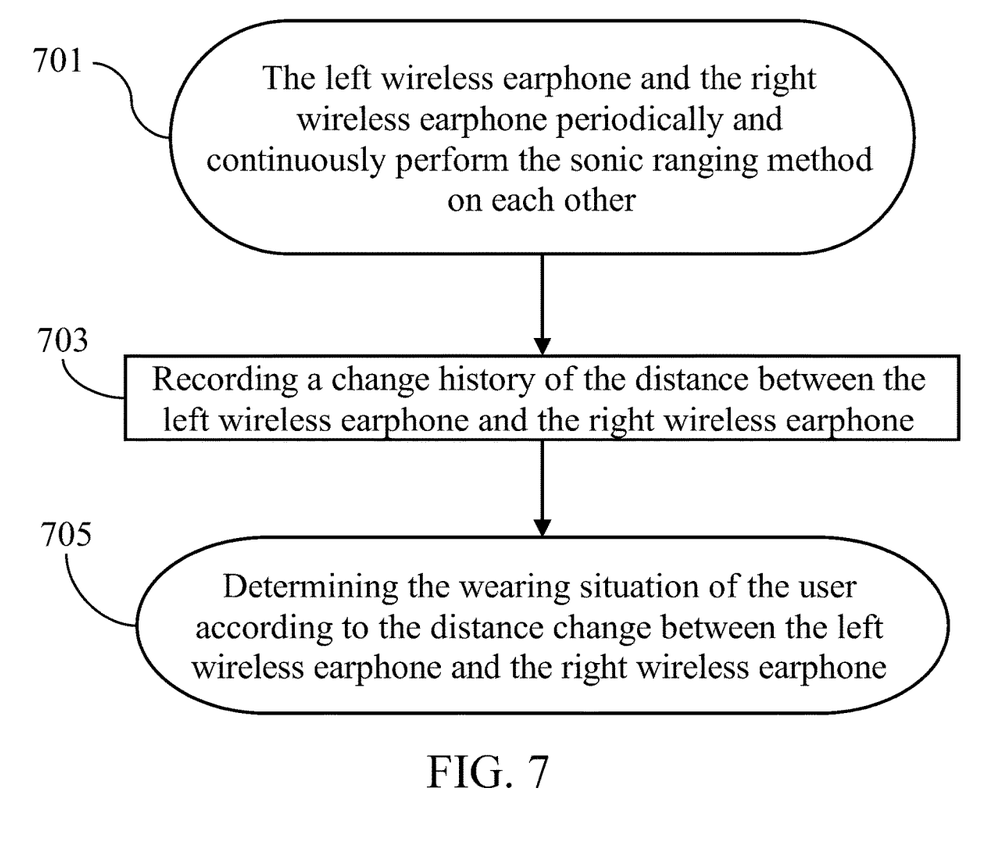
FIG. 7 is a flowchart of wireless earphone self-test according to an embodiment of the application.

FIG. 7 is a flowchart of self-testing the wireless earphone 200 according to the embodiment of the application. Since the wireless earphone 200 is usually connected in pairs, the distance between each other may also be used to determine the wearing situation or loss situation. In a further embodiment, the ranging method as shown in FIG. 3, the calibration procedure in FIG. 4, and the acoustic response test in FIG. 5 may also be performed between the two wireless earphones 200.

In step 701, the left wireless earphone and the right wireless earphone regularly perform the sonic ranging method for each other as shown in FIG. 3. In step 703, a change history of the distance between the left wireless earphone and the right wireless earphone is recorded in the left wireless earphone and the right wireless earphone respectively, or is recorded by the mobile phone 100. In step 705, the mobile phone may determine the wearing situation of the user according to the distance change between the left wireless earphone and the right wireless earphone. For example, under the stowage condition, the distance $D_1$ between the left wireless earphone and the right wireless earphone remains unchanged in a fixed range. The two wireless earphone 200 and mobile phone 100 form a triangle. Through interactive ranging, the distance change of human ear relative to mobile phone 100 may be estimated in real time, and the head posture may be perceived.

In a further embodiment, the method may be combined with a three-axis gyroscope in wireless earphone 200 to improve the accuracy of head pose detection.

In a further embodiment, the corresponding relationship between the time length and the distance measured in the calibration procedure may be stored in a data table. Thus, after the subsequent ranging program estimates the sound wave transmission time, the distance may be estimated directly by looking up the data table instead of calculating through the sonic formula. In addition, during calibration, to reduce the errors caused by attitude variations of the mobile phone 100, multiple mobile phone attitudes may be adapted in the acoustic response test. The measurement results may be further filtered to reduce the measurement error.

In a further embodiment, the ranging step may be carried out several times continuously, and the distance may be determined only after filtering, so as to reduce the measurement error and jitter.

To sum up, the sonic ranging method provided in the application may enable the mobile phone 100 to confirm the distance or attitude of the wireless earphone 200 without adding new hardware, so as to run a variety of applications.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A sonic ranging method for a mobile phone and a wireless earphone, comprising:
   the mobile phone performing an acoustic response test on the wireless earphone, comprising:
   the mobile phone generating a first audio sequence at a first time slot and plays an audible sound comprising the first audio sequence;
   when the wireless earphone recognizes the first audio sequence, the wireless earphone generating a second audio sequence to be played in ambience; and
   when the mobile phone recognizes the second audio sequence from the ambience, the mobile phone estimates a length of elapsed time according to a time difference between a current time slot and the first time slot; and
   when the mobile phone obtains the length of elapsed time, the mobile phone determining a distance between the wireless earphone and the mobile phone according to a delay compensation parameter and the length of elapsed time; wherein the delay compensation parameter comprises a length of time required by the mobile phone and the wireless earphone to process the first audio sequence and the second audio sequence.

2. The sonic ranging method as claimed in claim 1, wherein the wireless earphone and the mobile phone perform a calibration procedure to obtain the delay compensation parameter, the calibration procedure comprising:
- allocating the wireless earphone and the mobile phone to be separated by a first distance;
- performing the acoustic response test on the wireless earphone by the mobile phone to obtain a first round-trip response time;
- allocating the wireless earphone and the mobile phone to be separated by a second distance;
- performing the acoustic response test on the wireless earphone by the mobile phone to obtain a second round-trip response time; and
- the delay compensation parameter is deducted according to a difference between the first distance and the second distance, and a difference between the first round-trip response time and the second round-trip response time.

3. The sonic ranging method as claimed in claim 1, further comprising:
- after the mobile phone generates the first audio sequence, converting the first audio sequence an analog signal, amplifying, and playing the analog signal through a speaker module of the mobile phone.

4. The sonic ranging method as claimed in claim 1, further comprising:
- when the mobile phone performs the acoustic response test on the wireless earphone, transmitting a wireless signal to notify the wireless earphone to start an audio listening function;
- upon the wireless earphone turns on the audio listening function, the wireless earphone performing filtering, noise cancellation, echo cancellation, and digitalization on received ambient sound to generate a digital signal; and
- the wireless earphone identifies whether the digital signal contains the first audio sequence.

5. The sonic ranging method as claimed in claim 4, further comprising:
- when the wireless earphone recognizes that the digital signal contains the first audio sequence, generating the second audio sequence, and controlling the speaker module in the wireless earphone to amplify and play an audible signal comprising the second audio sequence.

6. The sonic ranging method as claimed in claim 1, further comprising:
- the mobile phone periodically performing the acoustic response test on the wireless earphone to track changes of the distance; and
- executing corresponding functions according to characteristics of the distance changes, comprising: sound effect control, volume control, fast forward, backward, start playing, or stop playing.

* * * * *